US012579766B2

(12) United States Patent
Lavi Itzhaki et al.

(10) Patent No.: US 12,579,766 B2
(45) Date of Patent: Mar. 17, 2026

(54) SYSTEM AND METHOD FOR RAPID OUTFIT VISUALIZATION

(71) Applicant: Revamped Ltd, Herzliya (IL)

(72) Inventors: Inbal Lavi Itzhaki, Herzliya (IL); Lahav Itzhaki, Herzliya (IL)

(73) Assignee: Revamped Ltd, Herzliya (IL)

( * ) Notice: Subject to any disclaimer, the term of this patent is extended or adjusted under 35 U.S.C. 154(b) by 142 days.

(21) Appl. No.: 18/586,703

(22) Filed: Feb. 26, 2024

(65) Prior Publication Data

US 2025/0272923 A1      Aug. 28, 2025

(51) Int. Cl.
| | |
|---|---|
| *G06T 19/00* | (2011.01) |
| *G06T 3/40* | (2006.01) |
| *G06T 5/50* | (2006.01) |
| *G06T 5/70* | (2024.01) |
| *G06T 5/77* | (2024.01) |
| *G06T 13/40* | (2011.01) |
| *G06T 19/20* | (2011.01) |
| *G06V 40/16* | (2022.01) |

(52) U.S. Cl.
CPC .............. *G06T 19/006* (2013.01); *G06T 3/40* (2013.01); *G06T 5/50* (2013.01); *G06T 5/70* (2024.01); *G06T 5/77* (2024.01); *G06T 13/40* (2013.01); *G06T 19/20* (2013.01); *G06V 40/161* (2022.01); *G06T 2207/20221* (2013.01); *G06T 2219/2016* (2013.01)

(58) Field of Classification Search
CPC ........... G06T 19/006; G06T 5/77; G06T 5/70;
G06T 3/40; G06T 5/40; G06T 13/40; G06T 19/40; G06T 2207/20221; G06T 2219/2016; G06T 19/20; G06T 11/60; G06T 2210/16; G06V 40/161; G06V 30/10; G06V 40/171; G06F 40/186; G06F 3/011
See application file for complete search history.

(56) References Cited

U.S. PATENT DOCUMENTS

| | | | |
|---|---|---|---|
| 8,525,828 B1 * | 9/2013 | Bates ...................... | G06T 15/00 |
| | | | 705/26.7 |
| 9,978,175 B2 * | 5/2018 | Corazza .................. | G06T 13/40 |
| 2021/0056754 A1 * | 2/2021 | Ju ............................ | G06T 17/10 |
| 2021/0118239 A1 * | 4/2021 | Santesteban ........... | G06N 3/044 |
| 2022/0309567 A1 * | 9/2022 | Han ........................ | G06T 19/20 |

* cited by examiner

*Primary Examiner* — Xilin Guo

(57) ABSTRACT

There is provided a method, comprising: in a set-up phase: instructing a ML image generator for generating avatar template images each depicting a different representative body type having different parameters, adapting s segmented source clothing item to correspond to the parameters of each avatar template image, for each avatar template image, generating a clothed image including the avatar template image wearing the adapted segmented source clothing item, during run-time: receiving an input image depicting a body of a user, computing parameters of the body of the user, searching the avatar template images for an avatar template image most correlated with the parameters of the body of the user, and presenting the clothed image associated with the avatar template image, wherein a body of an avatar wearing the segmented source clothing depicted in the clothed image emulates the body of the user virtually wearing the source clothing.

20 Claims, 9 Drawing Sheets

100

Access and/or train ML image generator
302

Access input into ML image generator
304

Instruct ML image generator using input
306

Obtain avatar template image(s) 308

Iterate
310

Extract keypoints from avatar image template 402

Parse avatar image 404

Blur avatar image 406

Divided blurred avatar image 408

Identify key regions on blurred avatar image 410

Generate segmentation mask for abdomen 412

Detect legs on blurred avatar image 414

Smooth blurred and parsed avatar image 416

SYSTEM AND METHOD FOR RAPID OUTFIT VISUALIZATION

BACKGROUND

The present invention, in some embodiments thereof, relates to generative machine learning (ML) models for virtual try on and, more specifically, but not exclusively, to systems and methods for virtually trying on an item of clothing using generative ML models.

Virtual try-on approaches include digital simulation or augmentation of trying on products, such as clothing, accessories, or cosmetics, using virtual or augmented reality technologies. This technology allows users to visualize how a product would look on them without physically wearing or using it. Virtual try-on experiences have become increasingly popular in the retail and e-commerce industries, providing consumers with a more immersive and interactive shopping experience.

SUMMARY

According to a first aspect, a computer implemented method of generating an image emulating a user visually trying on a clothing item, comprises: in a set-up phase: instructing a ML image generator for generating a plurality of avatar template images each depicting a different representative body type having a different plurality of parameters, accessing a segmented source clothing item, adapting the segmented source clothing item to correspond to the plurality of parameters of each avatar template image of the plurality of avatar template images, for each avatar template image, generating a clothed image including the avatar template image wearing the segmented source clothing item according to the adapted segmented source clothing item, during run-time: receiving an input image depicting a body of a user, computing a plurality of parameters of the body of the user depicted in the input image, searching the plurality of avatar template images for an avatar template image most correlated with the plurality of parameters of the body of the user, and presenting the clothed image associated with the avatar template image, wherein a body of an avatar wearing the segmented source clothing depicted in the clothed image emulates the body of the user virtually wearing the source clothing.

According to a second aspect, a system for generating an image emulating a user visually trying on a clothing item, comprises: at least one processor executing a code for: in a set-up phase: instructing a ML image generator for generating a plurality of avatar template images each depicting a different representative body type having a different plurality of parameters, accessing a segmented source clothing item, adapting the segmented source clothing item to correspond to the plurality of parameters of each avatar template image of the plurality of avatar template images, for each avatar template image, generating a clothed image including the avatar template image wearing the segmented source clothing item according to the adapted segmented source clothing item, during run-time: receiving an input image depicting a body of a user, computing a plurality of parameters of a body of a user depicted in the input image, searching the plurality of avatar template images for an avatar template image most correlated with the plurality of parameters of the body of the user, and presenting the clothed image associated with the avatar template image, wherein a body of an avatar wearing the segmented source clothing depicted in the clothed image emulates the body of the user virtually wearing the source clothing.

In a further implementation form of the first and second aspects, further comprising: extracting a head of the user including face and hair, from the input image, adapting the head according to the avatar template image, and for the clothed image, swapping the head of the avatar template image with the adapted head of the user.

In a further implementation form of the first and second aspects, the ML image generator is further fed instructions for adaptation of a training image of a body of a subject for generating an avatar template image depicting a body of an avatar based on the training image of the subject and adapted according to the instructions.

In a further implementation form of the first and second aspects, instructing the ML image generator is selected from: feeding a plurality of images of a plurality of subjects having a variety of body types, inpainting, feeding a prompt, and feeding the plurality of parameters.

In a further implementation form of the first and second aspects, the ML image generator is further fed the plurality of parameters in association with a respective image of a subject, wherein the plurality of parameters fed into the ML image generator are different than the plurality of parameters associated with the respective image of the subject, wherein the ML image generator further generates an outcome of the a body of an avatar having the plurality of parameters fed into the ML image generator.

In a further implementation form of the first and second aspects, the plurality of parameters associated with an avatar template image are obtained as an outcome of machine learning models fed the avatar template image, the machine learning models are trained on a training dataset of a plurality of training images of a plurality of subjects and/or avatars, each training image associated with a ground truth of the plurality of parameters measured on a subject and/or avatar depicted in the training image.

In a further implementation form of the first and second aspects, the plurality of avatar template images are iteratively generated by feeding in a training image of a subject and obtaining an avatar template image associated with a plurality of parameters, until a target range of values of combinations of the plurality of parameters is obtained.

In a further implementation form of the first and second aspects, the segmented source clothing item is adapted by stretching and/or resizing the segmented source clothing item according to the plurality of parameters to fit the avatar template image.

In a further implementation form of the first and second aspects, further comprising: computing a first set of keypoints from the avatar template image, segmenting a source clothing item from an input image depicting clothing, computing a second set of keypoints for the segmented source clothing item, mapping the second set of keypoints of the segmented source clothing item to the first set of keypoints of the avatar template image, wherein the clothed image is generated according to the mapping.

In a further implementation form of the first and second aspects, further comprising: computing a transformation of the segmented source clothing item from a current orientation for alignment with a pose of the avatar template image, according to the mapping of the second set of keypoints to the first set of keypoint, and applying the transformation to the segmented source clothing item and the second set of keypoints to generated a transformed source clothing item and transformed second set of keypoints, wherein the clothed image is created by projecting the re-oriented source clothing item to the avatar template image by matching the transformed second set of keypoints to the first set of keypoints and according to the plurality of parameters of the avatar template image.

In a further implementation form of the first and second aspects, further comprising: dividing the segmented source clothing into a plurality of parts, each of the plurality of parts associated with a subset of the second set of keypoints, wherein the transformation, the applying the transformation, and the projection, are performed separately for each of the plurality of parts of the source clothing item, and generating the clothed image comprises aggregating each of the individual projected plurality of parts of the source clothing item to create a composite image of the avatar template image wearing the source clothing item.

In a further implementation form of the first and second aspects, further comprising: computing a variable width linear mask on borders of a counter of the avatar template image corresponding to a region of the body of the avatar on which a part of the source clothing item is projected, wherein a plurality of masks corresponding to the plurality of parts of the source clothing items are computed, wherein the computation of the variable width linear mask is performed by prioritizing clothing in areas of overlap between the clothing and the avatar, performing inpainting on the composite image for filling in areas where the plurality of parts of the source clothing item were added for improving visual blending of the source clothing item with a body of the avatar depicted in the avatar template image, wherein inpainting is performed by feeding the mask, a text description of the source clothing item, and the composite image, into a generative artificial intelligence model designed for inpainting.

In a further implementation form of the first and second aspects, further comprising: parsing the avatar template image into a plurality of body parts, parsing the segmented source clothing item into a plurality of clothing parts, wherein mapping comprises mapping each clothing part to a corresponding body part according to a subset of the second set of keypoints of the parsed clothing part that correspond to a subset of the first set of keypoints of the corresponding body part.

In a further implementation form of the first and second aspects, parsing the avatar template image into a plurality of body parts comprises: parsing the avatar template image to create a parsed avatar image, blurring the parsed avatar image to create a blurred avatar image, dividing the blurred avatar image according to a first and second location of a first and second cluster of pixels having an average pixel value denoting an arm, for identifying a left arm and a right arm, on the blurred avatar image, detecting at least one of: a bra, underwear, and abdomen, generating a segmentation mask for the abdomen according to the abdomen detected on the blurred avatar image, applying the segmentation mask to the parsed image for identifying the abdomen, detecting and segment legs on the blurred avatar image, applying the detected and segmented legs to the parsed avatar image for identifying the legs, smoothing out the blurred avatar image for regenerating the parsed avatar image.

In a further implementation form of the first and second aspects, in response to the input image depicting the clothing being worn by a human or mannequin, the second set of keypoints is computed for the segmented source clothing item by applying a same ML model to the human or mannequin depicted in the input image that is applied to the avatar template image for extracting the first set of keypoints.

In a further implementation form of the first and second aspects, in response to the input image depicting the clothing alone without being worn by a human or mannequin, the second set of keypoints is predicted as an outcome of a ML model fed the source clothing item according to a type of the source clothing item.

In a further implementation form of the first and second aspects, the plurality of parameters of the body are selected from: at least one measurement of a region of a body, an upper body size, bottom body size, body shape, and skin color.

In a further implementation form of the first and second aspects, the avatar template image is selected as a certain avatar template image having a highest correlation between the plurality of body measurement parameters of the body of the user and the plurality of body measurements parameters of a certain avatar template image of the plurality of avatar template images.

In a further implementation form of the first and second aspects, the clothed image is generated as an outcome of a generative ML model fed the adapted segmented source clothing item overlaid on the avatar template image, an inpainting mask defining inpainting of the adapted segmented source clothing on the avatar template image, and a text description of the source clothing item.

In a further implementation form of the first and second aspects, adapting comprises stretching the segmented source clothing item to fit body measurements represented by of the avatar template image as defined by the plurality of parameters.

In a further implementation form of the first and second aspects, the plurality of parameters of the body of the user are computed according to a frontal picture of the user depicted in the input image and a height of the user complying with a set of rules.

In a further implementation form of the first and second aspects, segmenting the source clothing item comprises: in response to an input image depicting the clothing alone without being worn by a human or mannequin: segmenting the source clothing item from the input image depicting the clothing alone, and segmenting sleeves and/or pant legs and an inner portion from the segmented source clothing item.

In a further implementation form of the first and second aspects, further comprising segmenting the source clothing from an input image depicting the clothing being worn by a human or mannequin, by: segmenting the source clothing from the input image, creating an isolated clothing item image including the source clothing, detecting and segmenting at least one body part of the human or mannequin and/or other object occluding at least one region of the source clothing of the input image, updating a source clothing mask that defines borders of the segmented source clothing item for including borders of the at least one occluding body part and/or other object, using the updated source clothing mask, identifying one or more areas of the source clothing item for redrawing and/or recoloring for maintaining consistency of the source clothing, by computing an aggregation of colors of one or more regions of the source clothing, and applying the updated source clothing mask according the aggregation of colors to the identified one or more areas for creating a visually coherent image, creating a colored layer based on the aggregation of colors of the segmented source clothing, applying the colored layer to at least one missing part of the isolated clothing item image, and running an inpainting process on the isolated clothing item image with applied colored layer.

According to a third aspect, a computer implemented method of generating an image depicting a user visually trying on a clothing item, comprises: receiving an input image depicting a body of a user, computing a plurality of parameters for the body of the user, accessing a segmented source clothing item, adapting the segmented source clothing item to correspond to the plurality of parameters of the user in the image, and generating a clothed image including the user wearing the segmented source clothing item according to the adapted segmented source clothing item.

In a further implementation form of the third aspect, the segmented source clothing item is adapted by stretching and/or resizing the segmented source clothing item according to the plurality of parameters to fit the input image.

In a further implementation form of the third aspect, the input image comprises a first input image, and further comprising: computing a first set of keypoints from the first input image, segmenting a source clothing item from a second input image depicting clothing, computing a second set of keypoints for the segmented source clothing item, mapping the second set of keypoints of the segmented source clothing item to the first set of keypoints of the first input image, wherein the clothed image is generated according to the mapping.

In a further implementation form of the third aspect, further comprising: computing a transformation of the segmented source clothing item from a current orientation for alignment with a pose of the first input image, according to the mapping of the second set of keypoints to the first set of keypoint, and applying the transformation to the segmented source clothing item and the second set of keypoints to generated a transformed source clothing item and transformed second set of keypoints, wherein the clothed image is created by projecting the re-oriented source clothing item to the first input image by matching the transformed second set of keypoints to the first set of keypoints and according to the plurality of parameters of the first input image.

In a further implementation form of the third aspect, further comprising: dividing the segmented source clothing into a plurality of parts, each of the plurality of parts associated with a subset of the second set of keypoints, wherein the transformation, the applying the transformation, and the projection, are performed separately for each of the plurality of parts of the source clothing item, and generating the clothed image comprises aggregating each of the individual projected plurality of parts of the source clothing item to create a composite image of the user in the first input image wearing the source clothing item.

In a further implementation form of the third aspect, further comprising: computing a variable width linear mask on borders of a counter of the user corresponding to a region of the body of the user on which a part of the source clothing item is projected, wherein a plurality of masks corresponding to the plurality of parts of the source clothing items are computed, wherein the computation of the variable width linear mask is performed by prioritizing clothing in areas of overlap between the clothing and the user, performing inpainting on the composite image for filling in areas where the plurality of parts of the source clothing item were added for improving visual blending of the source clothing item with a body of the user, wherein inpainting is performed by feeding the mask, a text description of the source clothing item, and the composite image, into a generative artificial intelligence model designed for inpainting.

In a further implementation form of the third aspect, further comprising: parsing the first input image into a plurality of body parts, parsing the segmented source clothing item into a plurality of clothing parts, wherein mapping comprises mapping each clothing part to a corresponding body part according to a subset of the second set of keypoints of the parsed clothing part that correspond to a subset of the first set of keypoints of the corresponding body part.

In a further implementation form of the third aspect, parsing the first input image into a plurality of body parts comprises: parsing the first input image to create a parsed input image, blurring the parsed input image to create a blurred input image, dividing the blurred input image according to a first and second location of a first and second cluster of pixels having an average pixel value denoting an arm, for identifying a left arm and a right arm, on the blurred input image, detecting at least one of: a bra, underwear, and abdomen, generating a segmentation mask for the abdomen according to the abdomen detected on the blurred input image, applying the segmentation mask to the parsed image for identifying the abdomen, detecting and segment legs on the blurred input image, applying the detected and segmented legs to the parsed input image for identifying the legs, smoothing out the blurred input image for regenerating the parsed input image.

In a further implementation form of the third aspect, in response to the second input image depicting the clothing being worn by a human or mannequin, the second set of keypoints is computed for the segmented source clothing item by applying a same ML model to the human or mannequin depicted in the second input image that is applied to the first input image for extracting the first set of keypoints.

In a further implementation form of the third aspect, in response to the second input image depicting the clothing alone without being worn by a human or mannequin, the second set of keypoints is predicted as an outcome of a ML model fed the source clothing item according to a type of the source clothing item.

In a further implementation form of the third aspect, the clothed image is generated by inpainting the adapted segmented source clothing on the first input image.

In a further implementation form of the third aspect, adapting comprises stretching the segmented source clothing item to fit body measurements represented by of the input image as defined by the plurality of parameters.

In a further implementation form of the third aspect, segmenting the source clothing item comprises: in response to a third input image depicting the clothing alone without being worn by a human or mannequin: segmenting the source clothing item from the third input image depicting the clothing alone, and segmenting sleeves and/or pant legs and an inner portion from the segmented source clothing item.

In a further implementation form of the third aspect, further comprising segmenting the source clothing from a fourth input image depicting the clothing being worn by a human or mannequin, by: segmenting the source clothing from the input image, creating an isolated clothing item image including the source clothing, detecting and segmenting at least one body part of the human or mannequin and/or other object occluding at least one region of the source clothing of the input image, updating a source clothing mask that defines borders of the segmented source clothing item for including borders of the at least one occluding body part and/or other object, using the updated source clothing mask, identifying one or more areas of the source clothing item for redrawing and/or recoloring for maintaining consistency of the source clothing, by computing an aggregation of colors of one or more regions of the source clothing, and applying the updated source clothing mask according the aggregation of colors to the identified one or more areas for creating a visually coherent image, creating a colored layer based on the aggregation of colors of the segmented source clothing, applying the colored layer to at least one missing part of the isolated clothing item image, and running an inpainting process on the isolated clothing item image with applied colored layer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
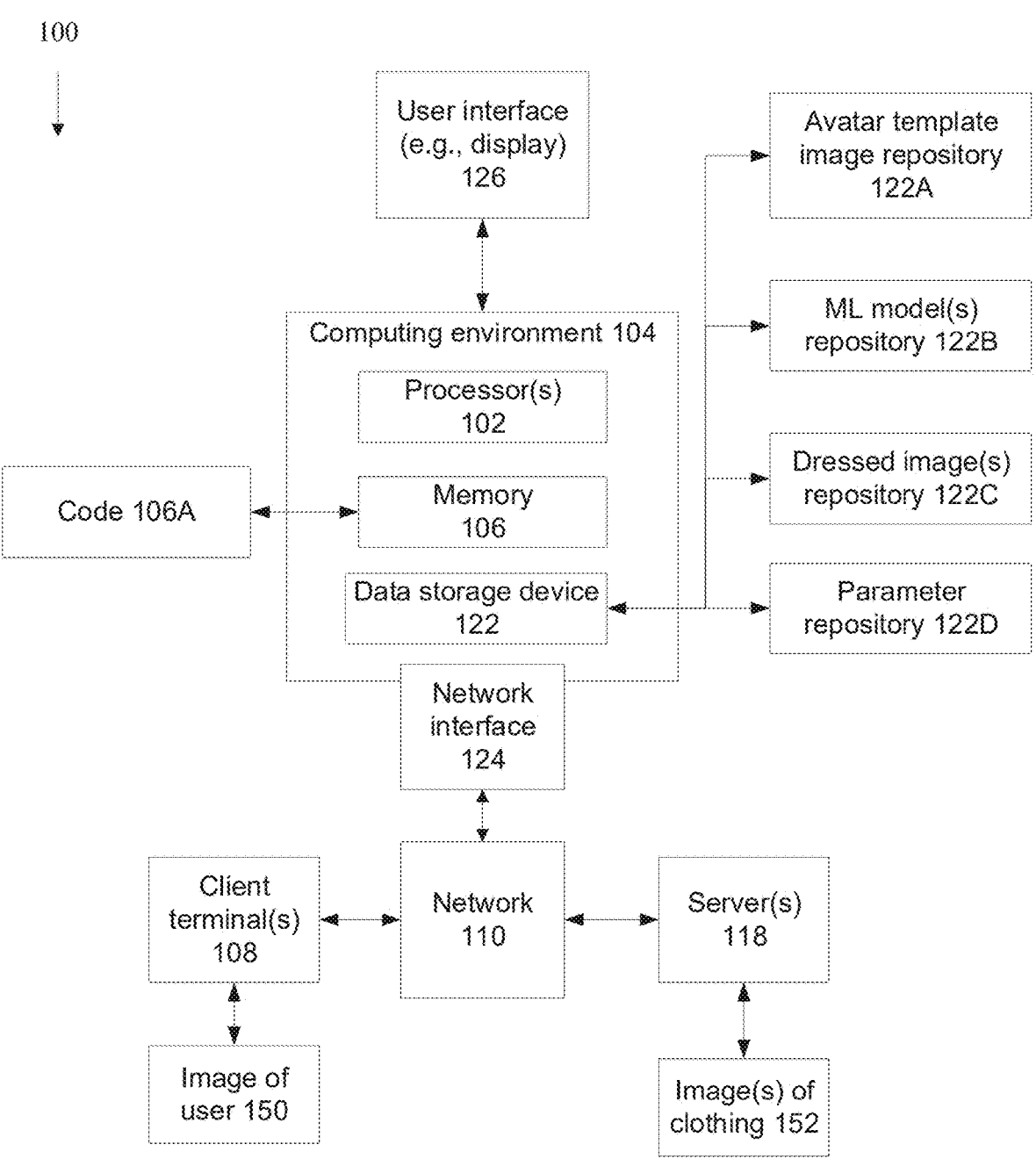
FIG. 1 is a block diagram of components of a system for generating an image emulating a user visually trying on at least one clothing item, in accordance with some embodiments of the present invention.

The present invention, in some embodiments thereof, relates to generative machine learning (ML) models for virtual try on and, more specifically, but not exclusively, to systems and methods for virtually trying on an item of clothing using generative models.

As used herein, the term machine learning (ML) model and artificial intelligence (AI) model are interchangeable.

As used herein, the term avatar template image refers to the body of the avatar depicted in the avatar template image.

An aspect of some embodiments of the present invention relates to systems, methods, computing devices, and/or code instructions (stored on a data storage device and executable by one or more processors) for generating an image emulating a user visually trying on at least one clothing item, where the person in the image wearing the clothing item(s) is not the user, but is an avatar having a body shape corresponding (e.g., most similar) to the body of the user, and is generated by an ML image generator. The image of the avatar trying on the clothing item(s) that emulates the user virtually trying on the clothing item(s) may be provided, optionally presented on a display of a client terminal, in real time or near real time. The image of the avatar emulating the user virtually trying on the clothing item(s) is found by computing parameters of a body of a real human user depicted in an input image, optionally captured and/or uploaded by the user. Avatar templates images are searched using the parameters of the body of the real human user to identify the avatar template image that is the closest match, optionally most correlated to the parameters. Examples of parameters include: skin color/tone, body shape, and one or more measurements of a region of a body, such as an upper body size, length of arms, chest circumference, length of legs, hip circumference, waist circumference, and other bottom body sizes. The clothed image associated with the identified avatar template image is provided as the emulation of the user wearing the clothing item(s). The head of the user depicted in the input image may be placed on the avatar depicted in the clothed image for making the clothed image appear more similar to the user.

In a set-up phase, the avatar template images may be created by instructing a ML image generator to create avatar template images each depicting a different representative body type having different parameters. The ML image generator may be instructed, for example, by feeding images of subjects having a variety of body types (into an image to image generator model), feeding a prompt (e.g., a text description of the body to generate), feeding the parameters, inpainting, a random value, and the like. The avatars depicted in the avatar template images are virtually dressed. One or more segmented source clothing items are obtained, optionally by segmenting one or more images depicting the source clothing items. The segmented source clothing items are adapted to correspond to the parameters of each avatar template image. For example, by stretching and/or resizing the source clothing item to "fit" the body of the avatar template image according to the parameters of each avatar body. For each avatar template image, a clothed image including the avatar template image wearing the segmented source clothing item(s) is generated according to the adapted segmented source clothing item(s). The same avatar template images may be virtually "dressed" with different clothing items.

The avatar template images enable avoiding use of images of real human subjects. The dressed image depicts an avatar's body that is virtually dressed, rather than the body of the real human subject, but which is designed to emulate the body of the real human subject. Using the avatar rather than the real human subject preserves privacy and/or dignity of the real human subject. At most, the head of the real human subject may be used in the dressed image, but the body in the dressed image is not of the real human subject.

It is noted that embodiments described herein with respect to virtually dressing up an avatar may be adapted to virtually dress up an image of a user rather than the avatar. An aspect of some embodiments of the present invention relates to systems, methods, computing devices, and/or code instructions (stored on a data storage device and executable by one or more processors) for generating an image depicting a user visually trying on a clothing item. An input image depicting a body of a user is received (e.g., accessed). Multiple parameters are computed for the body of the user. Examples of parameters and/or exemplary approaches for computing the parameters of the body of the user are described herein. A segmented source clothing item is segmented. The segmented source clothing item is adapted to correspond to the parameters of the user in the image. A clothed image including the user wearing the segmented source clothing item is generated according to the adapted segmented source clothing item.

At least some embodiments described herein address the technical problem of rapidly generating a realistic image of a user virtually trying on an item of clothing. At least some embodiments described herein improve the technology of approaches for virtually trying on clothing by a user, by enabling real time or near real time response. At least some embodiments described herein improve upon prior approaches for virtually trying on clothing by a user, which are slow and/or not realistic.

At least some embodiments described herein address the technical problem of improving performance of a computing device that generates images of a user virtually trying on an item of clothing, for providing real time or near real time response.

The technical problem may be particularly challenging when multiple images of the user trying on different clothing items are to be generated, and/or when generating an image of the user wearing more than one clothing item, such as a shirt and pants. Using standard approaches, the time to generate such images may be significantly long and/or may require significant amounts of processing resources, making it impractical for use. Deploying a virtual try on (VTON) algorithm on the image the user uploads in real time for every item explored would create a significant latency in results.

At least some embodiments described herein address the aforementioned technical problem, and/or improve the aforementioned technical field, and/or improve upon the aforementioned approaches, by a pre-generation of avatar template images. The avatar templates image are virtually dressed with an image of a segmented source clothing item. Now, the avatar template images are searched to find the avatar template image that has a body that is closest (e.g., most similar) to a body of a user depicted in an input image, for example, captured and/or uploaded by a user. The search may be done by extracting parameters from the body of the user depicted in the input image, and finding the body of the avatar having the closest parameters, optionally most correlated parameters.

At least some embodiments described herein address the technical problem of supporting images of clothing items in different presentation manners for generating a realistic image of a user virtually trying on the items of clothing. For example, enabling using clothing items depicted in images where a human model or mannequin physically wears the clothing, where the image is captured at different poses of the human or mannequin, where the human or mannequin partially cover the clothing item, and/or where an image of the clothing is not worn but taken at a frontal view of the clothing (i.e., item only image). Most existing virtual try on approaches are built to allow visualization of specific types of images only, for example tops only, top/bottom on full body model only, clothing item only, etc. This is usually easier to implement when the operator controls the source of the images for the clothing items, whether it's a retailer using its own virtual try on (e.g., specific retailer) or a fully coordinated integration of a third party try on product.

Another common constraint of existing virtual try on algorithms is that they require as input very specific types of images in terms of the body part the clothing item should be placed on and how it is presented: showing the item whilst including the full body of the model or just the relevant part, if at all (as some support a stand-alone image of the item only).

Clothing retailers, in particular online apparel brands, are striving to provide online and/or mobile shoppers with a better shopping experience that will increase conversion to actual purchase and decrease return rate. A significant contributor to that is the virtual try on's "try before you buy" experience; just like in an actual brick and mortar store. In light of the computational effort required to run virtual try on (VTON) algorithms, the mission of visualizing a clothing item, let alone an outfit, on a person in real time may be challenging. It may be, however, imperative, in light of online and mobile users' expectation for immediate gratification nowadays.

At least some embodiments described herein provide a solution to the aforementioned technical problem(s), and/or improve the aforementioned technical field(s), and/or improve upon the aforementioned existing approaches, by selecting an avatar template image associated with parameters most correlated with parameters of a body of the user, inferred by a set of computer-vision-based ML models from an input image. The dressed avatar template image is selected from multiple dressed avatar template images with different parameters that are generated by a ML image generator is response to an input, for example, images of subjects with a variety of body types, prompts, inpainting, parameters, random values, and/or other data. The parameters of the avatar template image, which may be known with high accuracy upon generation by the ML image generator, may enable obtaining a highly accurate adaptation of the source clothing item, for obtaining a highly realistic virtual try-on of the source clothing item by the body of the avatar depicted in the selected avatar template image. Moreover, pre-deployment of the try-on on the pre-computed avatar template images with known parameters enable real time or near real time generation of images of a selected avatar body virtually trying on an item of clothing, by reducing the amount of computational time and/or processing resources needed for generating the image. The improvement may be, for example, in terms of reduced processing time, reduced utilization of processing resources, reduced utilization of data storage, and the like. For example, in comparison to generating an image of a user virtually trying on an item of clothing directly from an original image of the user in real time. In addition, the pre-computed dressed avatar template images with known parameters enable virtual try-on from images of clothing items obtained in a variety of orientations, at different poses, whether worn on a body or not. Furthermore, at least some embodiments described herein are designed to be agnostic of the image type, for supporting images from multiple sources. Examples of different types of images that are supported include images of top/bottom on full body, images of top on upper body only, bottom on lower body only images, and clothing item only images.

At least some embodiments described herein may be designed to allow fast visualization of outfits, whilst supporting different types and/or sources for the images of the different clothing items that the outfit comprises. At least some embodiments described herein relate to the visualization of an outfit (both top and bottom included), while other embodiments relate to bottom clothing item or top clothing item only.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
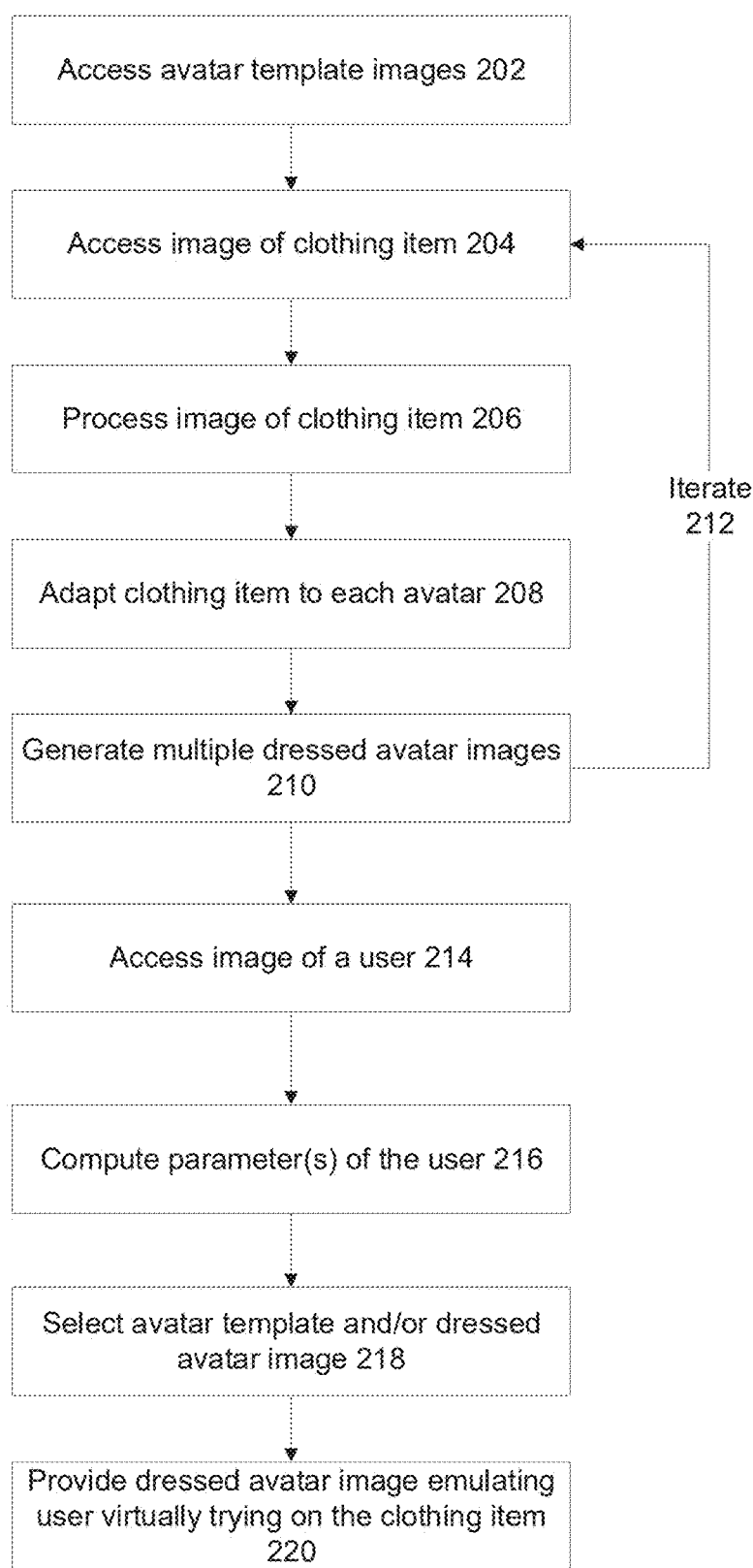
FIG. 2 is a flowchart of a method of generating an image emulating a user visually trying on at least one clothing item using an avatar template image, in accordance with some embodiments of the present invention.
Figure 3:
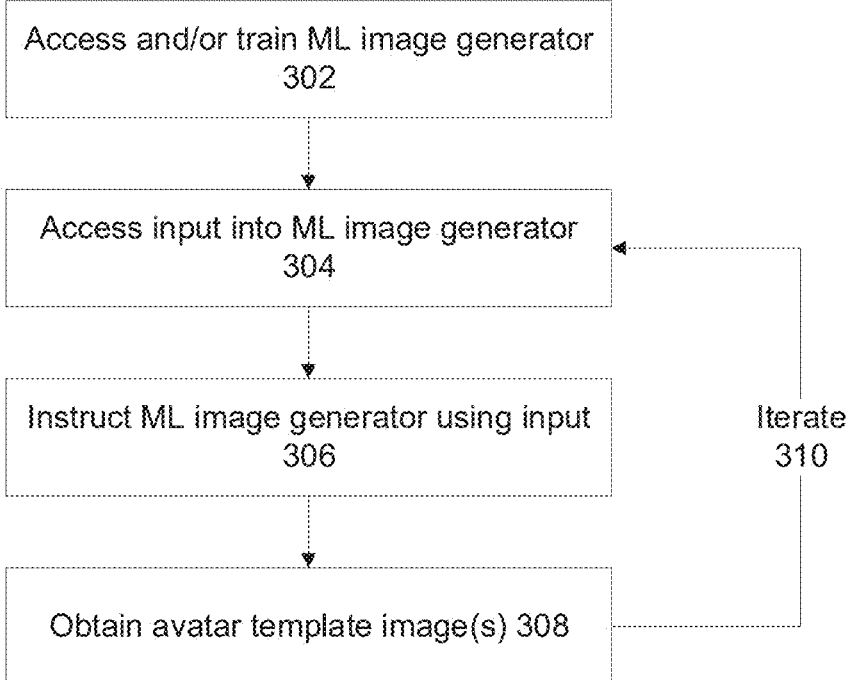
FIG. 3 is a flowchart of a method of generating avatar template images, in accordance with some embodiments of the present invention.
Figure 4:
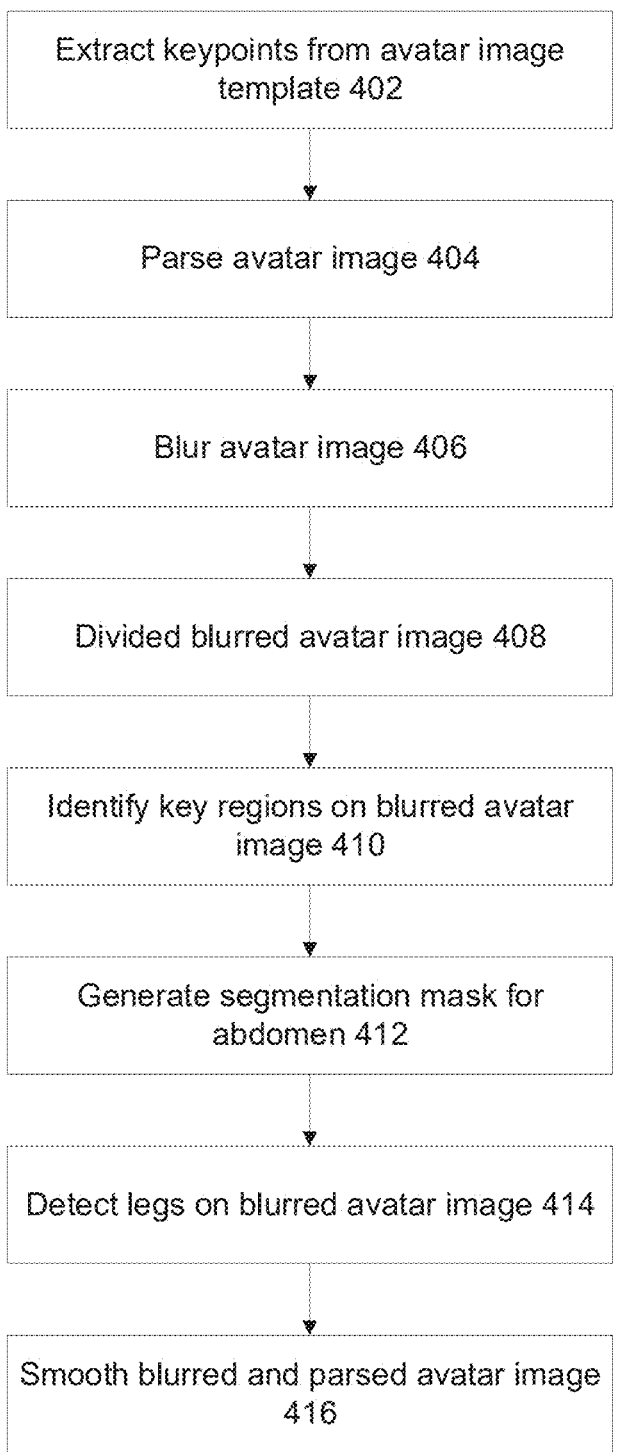
FIG. 4 is a flowchart of an exemplary process for pre-processing the generated avatar template images, in accordance with some embodiments of the present invention.
Figure 5:
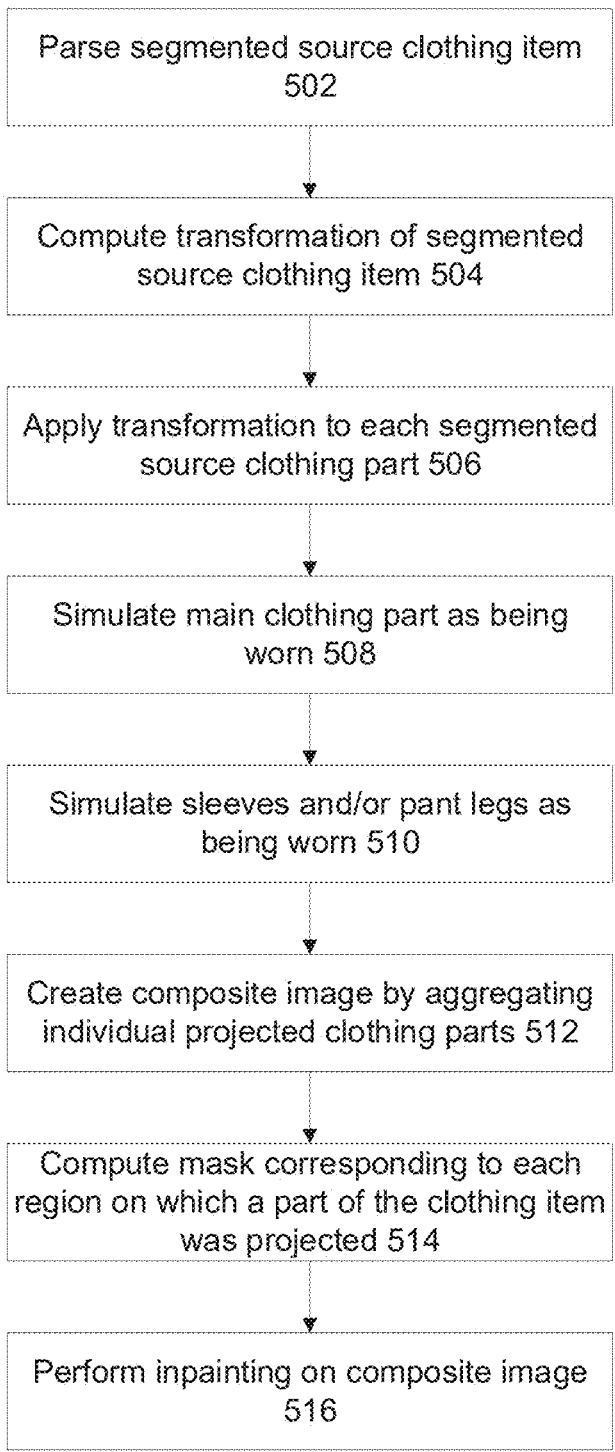
FIG. 5 is a flowchart of an exemplary method of generating a dressed avatar image including an avatar's body of an avatar template image wearing a source clothing item, in accordance with some embodiments of the present invention.
Figure 6:
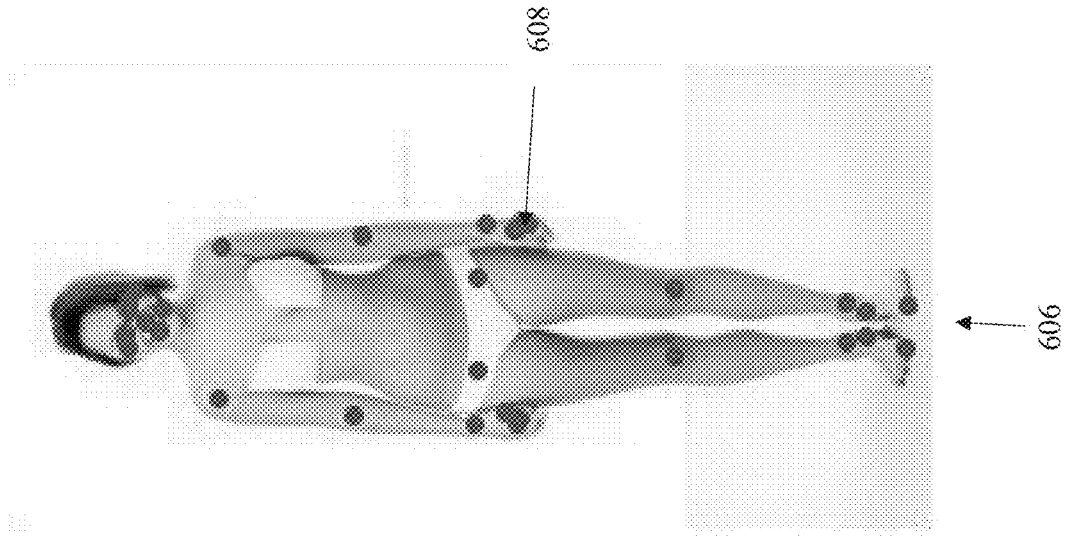
FIG. 6 is a schematic including an input image of a user and/or avatar, a segmented image of the user and/or avatar, and an image of the user and/or avatar with identified keypoints, in accordance with some embodiments of the present invention.
Figure 6:
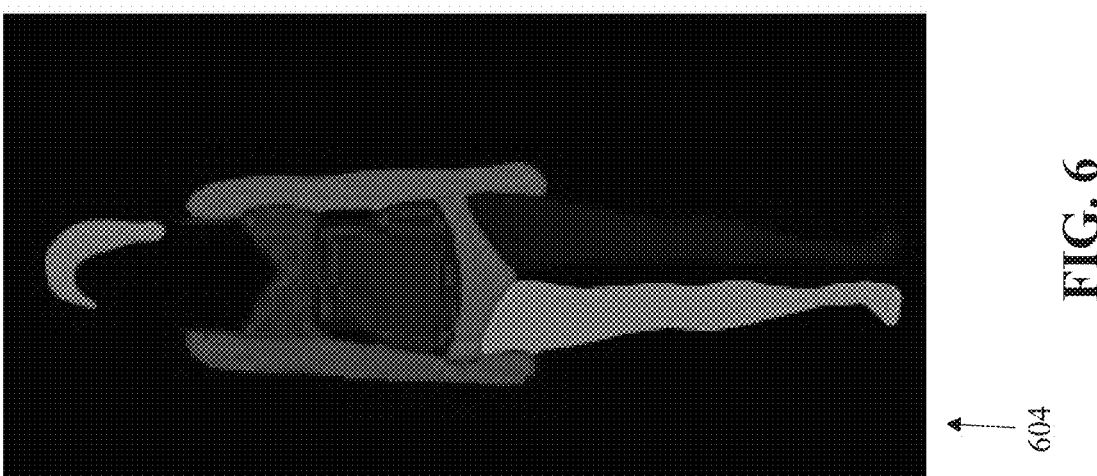
Figure 6:
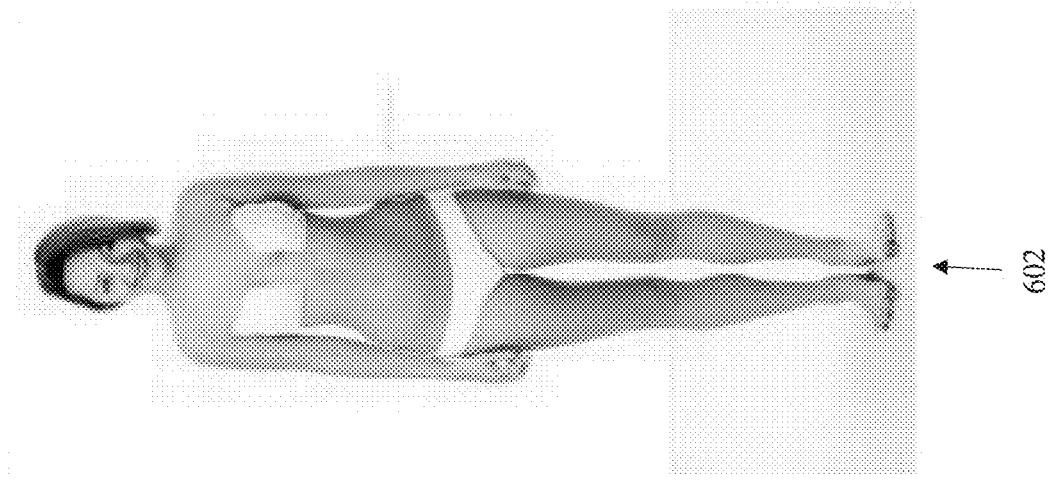
Figure 7:
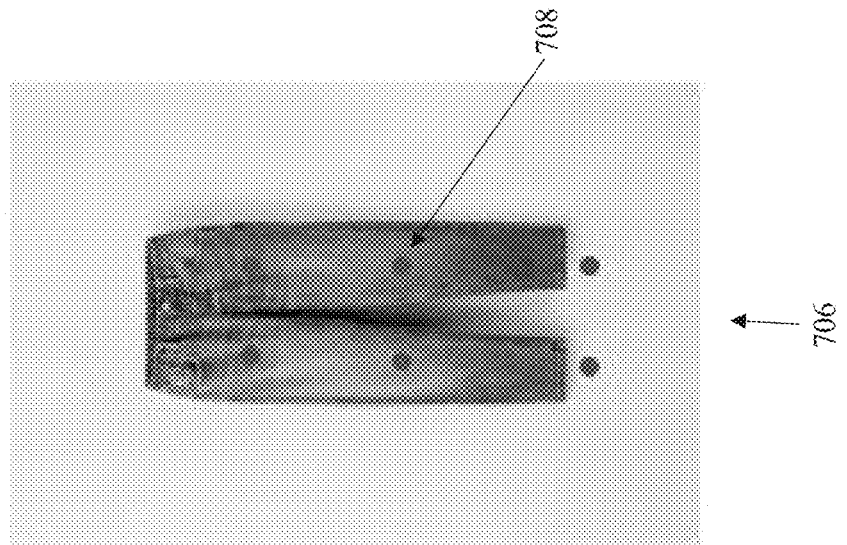
FIG. 7 is a schematic including an input image of an item of clothing, a segmented image, and an image with identified keypoints, in accordance with some embodiments of the present invention.
Figure 7:
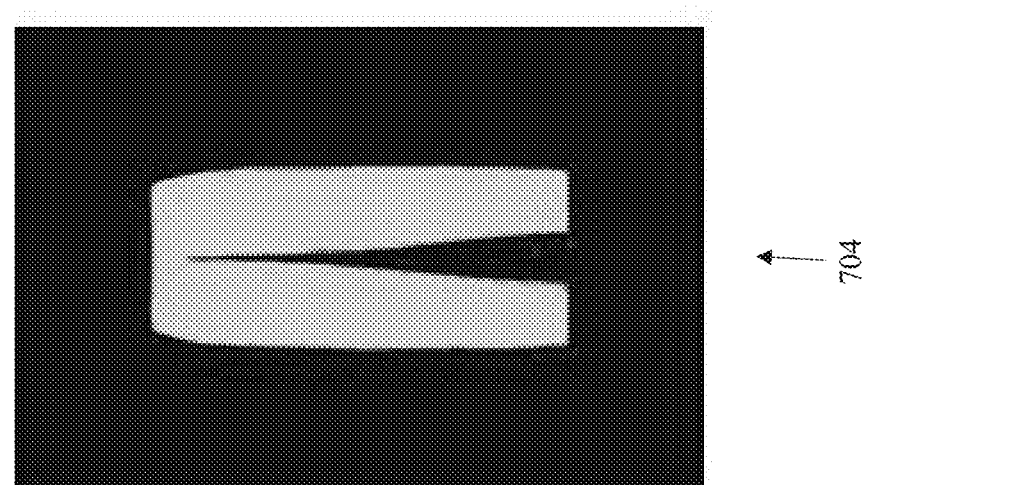
Figure 7:
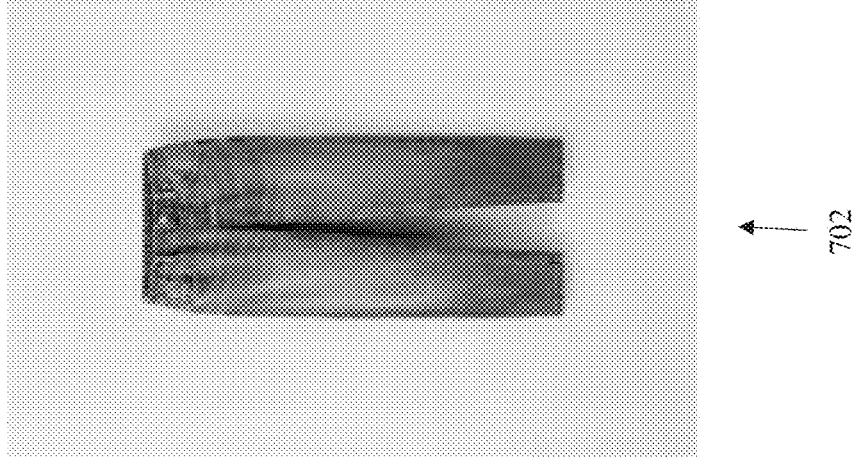
Figure 8:
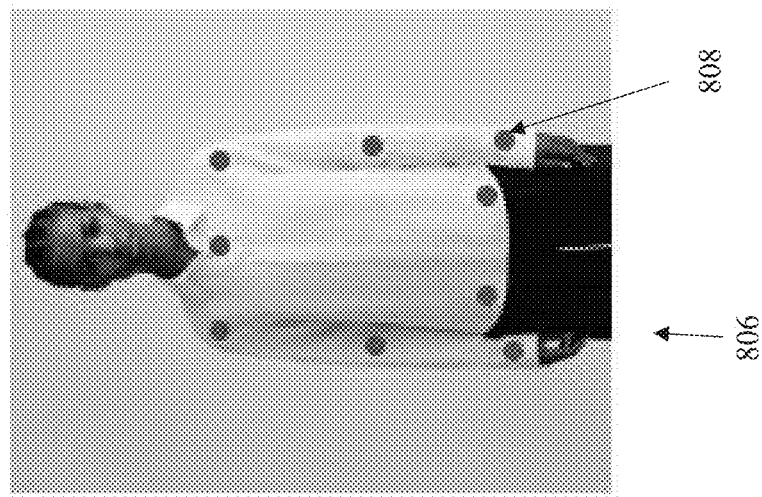
FIG. 8 is a schematic including an input image of an item of clothing including a top with sleeves worn on a body (e.g., human, mannequin), a segmented image, and an image with identified keypoints, in accordance with some embodiments of the present invention.
Figure 8:
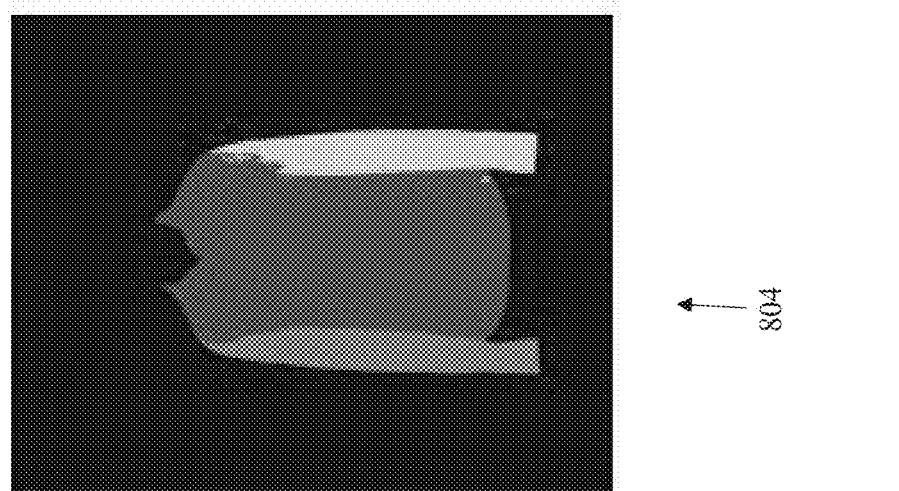
Figure 8:
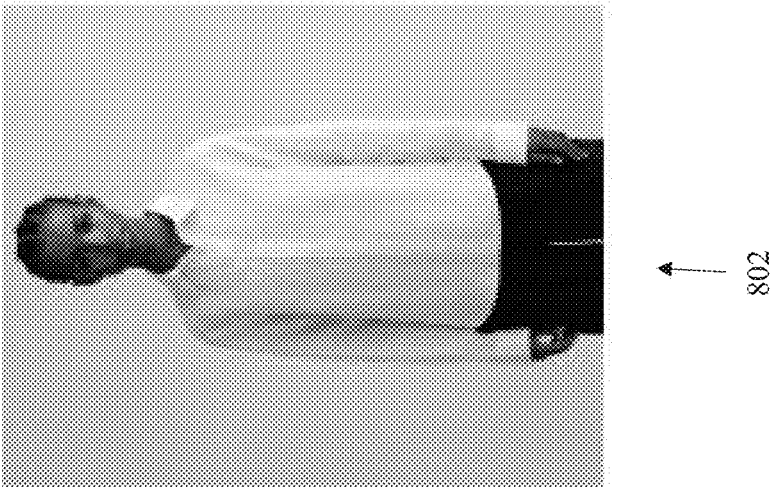
Figure 9:
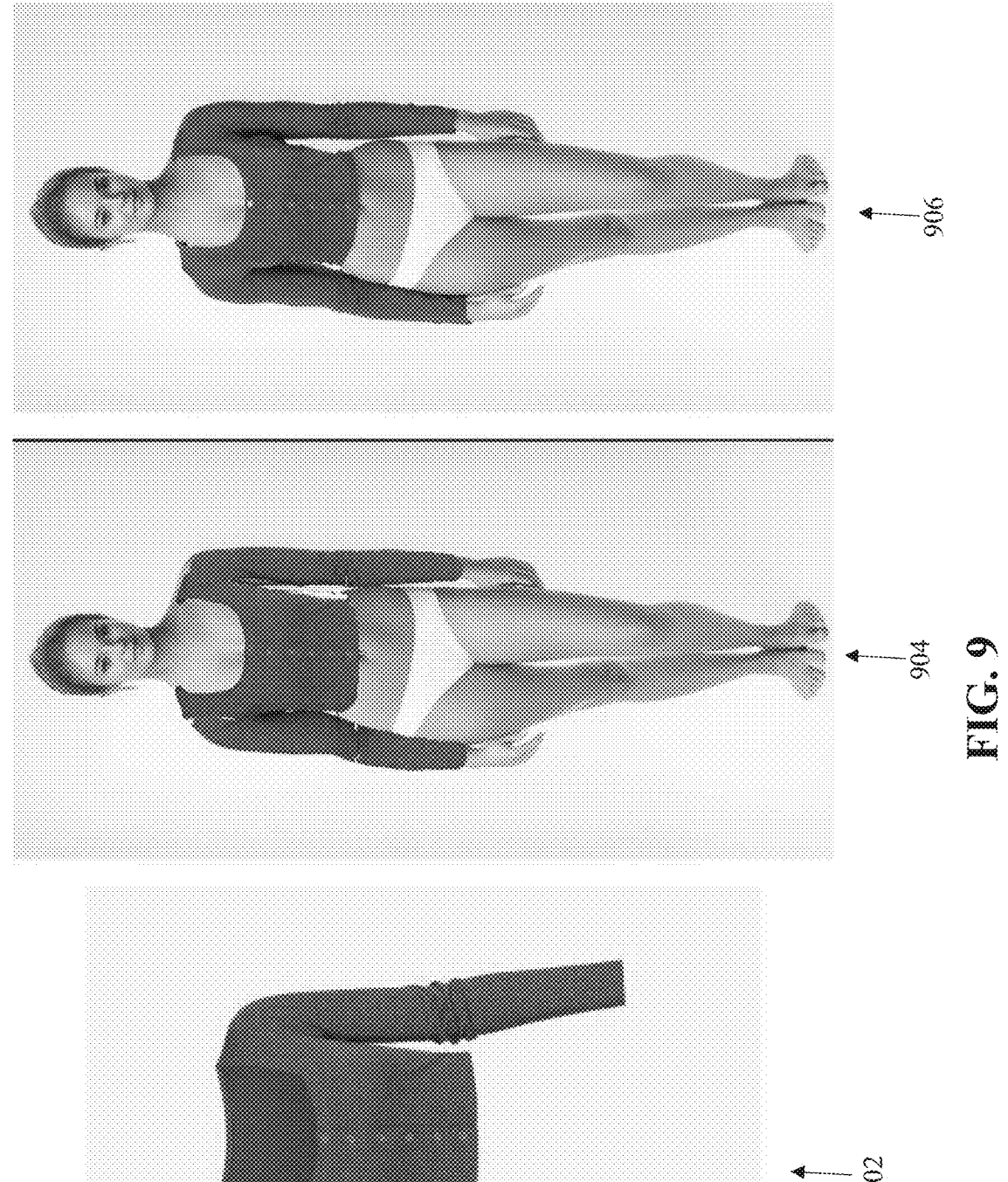
FIG. 9 is a schematic including an input image of an item of clothing including a top with sleeves, an image of an avatar wearing segmented parts of the clothing item, and an image of the avatar wearing the item of clothing created by aggregating the parts of the item of clothing, in accordance with some embodiments of the present invention.

Reference is now made to FIG. 1, which is a block diagram of components of a system 100 for generating an image emulating a user visually trying on at least one clothing item, in accordance with some embodiments of the present invention. Reference is also made to FIG. 2, which is a flowchart of a method of generating an image emulating a user visually trying on at least one clothing item using an avatar template image, in accordance with some embodiments of the present invention. Reference is also made to FIG. 3, which is a flowchart of a method of generating avatar template images, in accordance with some embodiments of the present invention. Reference is also made to FIG. 4, which is a flowchart of an exemplary process for pre-processing the generated avatar template images, in accordance with some embodiments of the present invention. Reference is also made to FIG. 5, which is a flowchart of an exemplary method of generating a dressed avatar image including an avatar's body of an avatar template image wearing a source clothing item, in accordance with some embodiments of the present invention. Reference is also made to FIG. 6, which is a schematic including an input image 602 of a user and/or avatar, a segmented image 604 of the user and/or avatar, and an image 606 of the user and/or avatar with identified keypoints 608, in accordance with some embodiments of the present invention. Reference is also made to FIG. 7, which is a schematic including an input image 702 of an item of clothing, a segmented image 704, and an image 706 with identified keypoints 708, in accordance with some embodiments of the present invention. Reference is also made to FIG. 8, which is a schematic including an input image 802 of an item of clothing including a top with sleeves worn on a body (e.g., human, mannequin), a segmented image 804, and an image 806 with identified keypoints 808, in accordance with some embodiments of the present invention. Reference is also made to FIG. 9, which is a schematic including an input image 902 of an item of clothing including a top with sleeves, an image of an avatar wearing segmented parts of the clothing item 904, and an image 906 of the avatar wearing the item of clothing created by aggregating the parts of the item of clothing, in accordance with some embodiments of the present invention.

System 100 may implement the acts of the method described with reference to FIGS. 2-9, by processor(s) 102 of a computing device 104 executing code instructions stored in a memory 106 (also referred to as a program store).

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing environment 104 generates an image (e.g., 122C) depicting a virtual try-on of a clothing item, optionally depicted in an image 152, emulating a user depicted in an image 150, as described herein.

Image of user 150 may be provided, for example, captured by an image sensor (e.g., camera), accessed from a data storage device, obtained from a remote device over a network, and the like. The image sensor capturing image of user 150 may be, for example, a standalone camera, a camera integrated into a mobile device (e.g., smartphone, tablet), a camera connected and/or integrated with a laptop or desktop (e.g., for videoconferencing) and the like.

Image of clothing 152 may be provided, for example, captured by an image sensor (e.g., camera of a smartphone), accessed from a data storage device (e.g., image of models wearing different clothes captured during a fashion show), obtained from a remote device over a network (e.g., images presented on a website of an online clothing retailer), and the like.

Multiple architectures of system 100 based on computing device 104 may be implemented. For example:

Computing device 104 may be implemented as a stand-alone device (e.g., kiosk, client terminal, smartphone) that include locally stored code instructions 106A that implement one or more of the acts described with reference to FIGS. 2-9, for locally performing an emulation of a virtual try on of a clothing item on an image of a user using code 106A. The locally stored code instructions 106A may be obtained from a server, for example, by downloading the code over the network, and/or loading the code from a portable storage device, such as by installing an app on a smartphone of a user. The generated image emulating the user virtually trying on the item of clothing may be presented on a display (e.g., user interface 126), printed (e.g., by a printer not shown), and/or stored on a data storage device (e.g., local memory and/or remote storage service). In an example, a user uses a camera on their smartphone (e.g., client terminal 108) to capture a picture of themselves (150). An image of a shirt for sale (152) that may be recommended to the user may be obtained from, for example, a webpage of an online clothing retailer (e.g., hosted by server 118). An app (e.g., code 106A) locally running on the smartphone (e.g., client terminal 108) generates an image (e.g., 122C) emulating the user virtually wearing the shirt, as described herein.

Computing device 104 executing stored code instructions 106A, may be implemented as one or more servers (e.g., network server, web server, a computing cloud, a virtual server) that provides centralized services (e.g., one or more of the acts described with reference to FIGS. 2-9). Services may be provided, for example, to one or more client terminals 108 over network 110, and/or to one or more server(s) 118 over network 110. Server(s) 118 may include, for example, online clothing retailers selling clothing that wish to provide their users with the option of generating an image of emulating the users virtually wearing clothing being sold by the clothing retailers. Clients 108 may be, for example, of individual people wishing to generate images emulating themselves virtually wearing a certain desired item of clothing, and/or located at physical stores selling clothing to help users select which clothes to try or (or buy without trying on) by first generating an image emulating a shopper virtually trying on an item of clothing. Services may be provided to client terminals 108 and/or server(s) 118, for example, as software as a service (SaaS), a software interface (e.g., application programming interface (API), software development kit (SDK)), an application for local download to the client terminal(s) 108 and/or server(s) 118, an add-on to a web browser running on client terminal(s) 108 and/or server(s) 118, and/or providing functions using a remote access session to the client terminals 108 and/or server(s) 118, such as through a web browser executed by client terminal 108 and/or server(s) 118 accessing a web sited hosted by computing device 104. For example, images of user(s) 150 are provided from each respective client terminal 108 and/or server(s) 118 to computing device 104. Images of clothing 152 are provided from respective client terminal(s) 108 and/or server(s) 118 and/or other sources. Computing device centrally computes images (e.g., 122C) of avatars virtually wearing respective items of clothing. A clothed image (e.g., 122C) most similar to the body of the user depicted in image 150 may be provided, for example, for presentation on a display of each respective client terminal 108 and/or server(s) 118, for printing, and the like.

Processor(s) 102 of computing device 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-9 when executed by hardware processor(s) 102.

Computing device 104 may include a data storage device 122 for storing data, such as one or more code based processed described herein, for example, avatar template image repository 122A designed to store different avatar template images of avatar with bodies of different types and/or sizes and/or shapes, computed as described herein, ML model repository 122B designed to store one or more ML models described herein, dressed images repository 122C designed to store images of avatars virtually wearing clothing items, and/or parameter repository 122D designed to store parameters of the avatar template images for finding the avatar template image most similar to image of user 150, as described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Exemplary architectures of the machine learning models 122B described herein include, for example, statistical classifiers and/or other statistical models, neural networks of various architectures (e.g., convolutional, fully connected, deep, encoder-decoder, recurrent, graph, transformer), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised and/or reinforcement learning. ML models 122B may be open source and/or publicly available models, and/or customized models.

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 and/or client terminal(s) 108 include and/or are in communication with one or more physical user interfaces 126 that include a mechanism for a user to enter data (e.g., select image of user 150 and/or image of clothing 152) and/or view the created image emulating the user virtually wearing the item of clothing (e.g., 122C). Exemplary user interfaces 126 include, for example, one or more of, a touchscreen, a display, gesture activation devices, a keyboard, a mouse, and voice activated software using speakers and microphone.

Referring now back to FIG. 2, features described with reference to 202 to 212 represent a set-up phase for generating dressed up images of multiple avatars with different body types, different body sizes, different body shapes, and/or different skin colors and/or skin tones, each dressed up with a clothing item depicted in an image. Features described with reference to 214-220 may represent a runtime phase for selecting the dressed avatar image that most resembles an image of a user as provided in an input image.

At 202, multiple avatar template images are generated and/or accessed. The multiple avatar template images include a variety of different representative body types depicted by avatar bodies having different parameters, which are expected to represent and correspond to a variety of body types with respective parameters of real users that wish to virtually try on clothing. Examples of parameters include: skin color/tone, body shape, and one or more measurements of a region of a body, such as an upper body size, length of arms, chest circumference, length of legs, hip circumference waist circumference, and other bottom body sizes.

An exemplary approach for generating the avatar template images is described with reference to FIG. 3. Briefly, a ML image generator is instructed for generating multiple avatar template images. The ML image generator may be instructed, for example, by feeding images of subjects having a variety of body types, inpainting, feeding a prompt, and feeding parameters. The ML image generator may be implemented, as for example, an image to image generative ML model, a prompt (e.g., text) based generative ML model that generates an avatar having a body according to the prompt (e.g., specific skin color, specific parameter(s)), a random generative ML model, and the like. Each avatar template image depicts a different representative body type having different parameters. The avatar template images generated by the ML image generator have known parameters which may be different and/or wider than the parameters of the input images of the real human subjects, which may include combinations of parameters not specifically represented in the images of real human subjects.

The avatar template images may represent an array of depictions of potential users. The avatar template images may be based on initial mapping of relevant combinations of upper and bottom body sizes, combined with body shape and skin color, representing a range of values of parameters. The avatar template images may represent various "human models", i.e., depiction of potential users, created based on an AI image generator for completing gaps in some of the options (e.g., parameters) such as through relevant prompting. The process for creating avatar template images may be iterated for different skin colors. The process may repeat the creation of depiction of potential users, followed by parameter (e.g., size and body shape) prediction for those "potential users", until the desired options of potential users' depictions are obtained.

At 204, one or more images depicting one or more items of clothing (also referred to herein as a source item of clothing) are accessed.

An item of clothing depicted in image which are processed for being worn by the selected avatar template image are sometimes referred to herein as a source clothing items. The item of clothing is for being worn on the upper body, lower body, or full body, for example, shirt, vest, sweater, coat, pants, shorts, skirt, dress, and the like.

Embodiments described here relate to a single item of clothing, but it is to be understood that features described herein for generating an image of the avatar template image wearing the item of clothing may be implemented for each item of clothing, for generating an image depicting the avatar simultaneously wearing different items of clothing, for example, matching shirt and pants.

The image of clothing may depict, for example:

A single item of clothing.

Multiple items of clothing.

Clothing not worn by a body (e.g., not worn by a human and/or mannequin). For example, clothing laid out flat.

Clothing worn by the body such worn by a human and/or mannequin. The body may be wearing multiple clothing items, where a single clothing item is of interest. For example, the body may be wearing a hat, shirt, and pants, where the shirt is of interest.

In another example, the body may be wearing multiple clothing items, where the multiple clothing items are of interest.

The image of the clothing may be obtained, for example, from an online catalogue of a clothing retailer, from images posted online by different sources, from a database of images, and/or captured by the user depicted in the first input 2D image.

The image of the clothing may be selected, for example, by an automated recommendation engine that analyzes input for the user for recommending one or more clothing items.

At 206, the image of the clothing item may be processed, by segmenting and/or extraction of keypoints.

The source clothing item may be segmented from the image depicting the clothing item(s). In the case of multiple items of clothing (e.g., shirt and pants), each source clothing item may be individually segmented.

The image may be analyzed to determine whether the source clothing item is shown alone without being worn by a body (e.g., human or mannequin), or whether the source clothing item is being worn by the human or mannequin. The analysis may be performed, for example, by image processing code that detects outlines and/or features for determining whether outlines and/or features in proximity to the clothing item represent a body (e.g., human or mannequin). In another example, the analysis may be performed by a ML model training on a training dataset of images depicting source items, with a ground truth indication of whether the clothing is worn by a body and not worn by a body.

Optionally, in response to the second input 2D image depicting the clothing (e.g. alone) without being worn by the body (e.g., human or mannequin), the source clothing item may be segmented from the second input 2D image by a segmentation process. Optionally, the clothing item is segmented in pieces, where each piece may be individually segmented. The segmentation may not necessarily follow the physical make-up of the clothing item. For example, a shirt may be segmented by segmenting a right sleeve, a left sleeve, and a central part. In another example, each sleeve may segmented by segmentation into a top part of the sleeve and a bottom part of the sleeve.

Alternatively, in response to the image depicting the clothing being worn by the body (e.g., human or mannequin) the following exemplary approach may be used for segmenting the source clothing from the body. The technical challenge is that the clothing may be obstructed by parts of the body, such as by hair and/or hands, and/or by another object(s) such as placed in front of the clothing. The obstructing body part(s) and/or object(s) creates "holes" in the segmented clothing item, which may appear unnatural when virtually worn by the avatar (or image of the user). Approaches described herein are designed to account for such "holes" for creating a natural look when the segmented clothing item is virtually worn by the avatar and/or image of the user.

The exemplary approach is for segmenting the source clothing from the input image depicting the clothing being worn by the human or mannequin, where one or more regions of the source clothing are obstructed, is now described. The source clothing is segmented from the input image, for example, using a segmentation model and/or image processing approaches. An isolated clothing item image including the source clothing may be created, for example, on a white background. One or more body parts of the human or mannequin (e.g., hair, hands) and/or other object(s) (e.g., located in front of the clothing item) occluding one or more regions of the source clothing of the input image may be detected and/or segmented. A source clothing mask that defines borders of the segmented source clothing item may be updated for including borders of the occluding body part(s) and/or other object(s). Using the updated source clothing mask, one or more areas of the source clothing (e.g., representing "holes" or "missing parts" in the source clothing) are updated for redrawing and/or recoloring for maintaining consistency of the source clothing. An aggregation of colors is computed for the regions (e.g., "holes" or "missing parts") of the source clothing, for example, an average of colors, a median of colors, and/or a distribution of colors). The updated source clothing mask is applied to the identified area(s) (e.g., "holes" or "missing parts") for creating a visually coherent image. A colored layer may be created based on the aggregation of colors of the segmented source clothing. The colored layer may be applied to the missing part(s) (e.g., relevant missing part(s)) of the isolated clothing item image. An inpainting process (e.g., AI model based) may be run on the isolated clothing item image with applied colored layer. The updated source clothing mask may be redrawn according to the combination of the overlaid colored layer and the source clothing item, for example, using generative AI inpainting approaches. The redrawn updated source clothing mask may be applied to the image depicting the body to segment the source clothing item worn on the body, optionally into different portions, for example, sleeves, pant legs, main central part of the shirt, and the like.

A second set of keypoints may be computed for and/or extracted from the segmented source clothing item. The second set of keypoints may correspond to the first set of keypoints extracted from the avatar template image, for enabling matching features between the first set and the second set. The approach of extracting the second set of keypoints may be based on whether the image depicts the source clothing being worn on a body or not.

Optionally, in response to the second input 2D image depicting the clothing being worn by the body (e.g., human or mannequin), the second set of keypoints may be computed for the segmented source clothing item by applying a ML model to the body (e.g., human or mannequin) depicted in the second input 2D image. The ML model is trained to extract keypoints, optionally keypoints associated with pose of the body. The ML model may be the same or similar ML model used to extract the first set of keypoints from the avatar template image.

Alternatively, the image does not depict a body. For example, the ML model trained to extract keypoints of the body, optionally keypoints associated with pose, is unable to extract (or accurately extract) the keypoints and/or generates an error message that no body is depicted. In response to the image depicting the clothing (e.g., alone) without being worn by the body (human or mannequin) the second set of keypoints may be predicted as an outcome of a ML model fed the source clothing item according to a type of the source clothing item. For example, one ML model may be trained for extraction of keypoints from an item of clothing worn on the upper body (e.g., shirt), and another ML model may be trained for extraction of keypoints from an item of clothing worn on the lower body (e.g., pants). Specialized ML models may be use for clothing for different parts of the body, since clothing that is not worn may take on a much larger number of special orientations and/or configurations, such as poses, folds, overlap, and the like, in comparison to clothing worn on a body which is limited in pose by the shape and pose of the body.

At 208, the segmented source clothing item may be adapted to correspond to each body of each avatar depicted in each of the avatar template images. The adaptation may be performed according to the parameters of the body of the avatar associated with each respective avatar template image.

The segmented source clothing item may be adapted by stretching and/or resizing the segmented source clothing item according to the parameters to fit the body of the avatar depicted each respective avatar template image.

At 210, multiple dressed avatar images are generated.

Each image includes a respective body of the avatar depicted in a respective avatar template image wearing, i.e., virtually trying on, the adapted segmented source clothing. The avatars of the avatar template image, optionally all of the avatars of the generated avatar template images, may be dressed up with the same segmented source clothing item(s).

Each image visually depicts how the same clothing item would look on each respective body of each respective avatar, taking into account the avatar's pose and the garment's shape and size.

The dressed avatar images may be created from the segmented source clothing item, which may be worn on a human body in a certain pose (e.g., folded arm, hand on waist, or legs in a specific angle), and dressing each avatar with a different pose with the same clothing item, for example, an avatar standing straight with arms to the sides of the body.

Optionally, the second set of keypoints of the segmented source clothing item is mapped to the first set of keypoints of each avatar template image. The mapping may be done by matching features of the first set with the second set. Each dressed avatar image may be generated according to the mapping which may be used to fit the segmented source clothing to the body of each avatar.

Alternatively or additionally, each dressed image may be generated by inpainting the adapted segmented source clothing on each avatar template image, optionally according to the mapping of the key points.

Alternatively or additionally, each dressed avatar image may be generated by a generative AI model that is fed the selected avatar template image and the adapted segmented clothing item overlaid on the avatar template image (e.g., overlaid according to the mapped keypoints), the inpainting mask (e.g., created as described with reference to 212 of FIG. 2 for defining inpainting of the adapted segmented source clothing on the avatar template image), and optionally a text description of the source clothing item.

At 212, features described with reference to 204-210 may be iterated. Each iteration may be for a different source clothing item, for generating another set of dressed avatar images wearing each different source clothing item. For example, a certain user may be debating between two shirts. A first set of dressed avatar images wearing a first shirt may be created, and a second set of dressed avatar images wearing a second shirt may be created, which may enable the user to compare.

At 214, an image of a user, optionally a 2D image, is accessed. The image of the user may be referred to herein as an input image. The user may provide the input image, for example, by using a camera on their smartphone and/or a stand-still camera, and/or a digital video camera, to capture an image of themselves.

The user may be instructed to take a picture complying with a set of rules.

The image may be processed to evaluate that the set of rules are met, for example, by image processing approaches that extract features and analyze the features (e.g., extract outline and/or features of the body and/or face and estimate pose of the use), and/or using one or more ML models trained on images of users labelled with ground truth labels indicating whether the set of rules are met or not.

The set of rules may indicate: a frontal picture of the user, arms away from the body (e.g., to help ML model distinguish the arms from the body), capture image using a smartphone located at waist height, and the like.

At 216, optionally, parameters of the body of the user are computed using the input image and/or other data, for example, height of the user. The height of the user may be used to estimate the parameters, optionally in combination with the image of the body of the user.

The other data may be obtained, for example, manually entered by a user via a user interface (e.g., graphical user interface (GUI)) presented on a display.

The parameters computed for the body of the user using the input image and/or other data (e.g., height) may correspond to the parameters of the avatar template images.

Parameters (e.g., sizes and/or body shape) may be predicted (e.g., computed) using the output of a computer vision process, developed to analyze different measures in a 2D image of a user using an array of models developed for estimating body measurements. Processes for estimating parameters (e.g., body sizes and/or shape) based on a 2-D image may be created. The processes may predict the parameters (e.g., sizes and/or body shape) of the different images produced through ML models and/or AI models.

Parameters may be computed, for example, as described herein, such as with reference to 302 of FIG. 3.

At 218, an avatar template image is selected from the multiple generated avatar template images. The corresponding dressed avatar image corresponding to the selected avatar template image may be identified. Alternatively, a dressed avatar image is selected from the multiple dressed avatar images.

The avatar template image and/or the dressed avatar image may be selected by searching the set of generated avatar template images and/or the set of dressed avatar image. The search may be performed using the parameters computed for the input image, over the parameters of the avatar templates images.

The avatar template image may be selected as the avatar template image that is most similar to the body of the user depicted in the input image. It is noted that the selected avatar template image is similar to the body of the user but does not actually depict the real body of the user, thereby protecting privacy and/or anonymity of the body of the user.

The avatar template image may be selected as the avatar template image with highest correlation to the body of the user depicted in the input image, optionally according to the parameters of the avatar template image with respect to the parameters of the body of the user depicted in the input image. The correlation may be computed, for example, by applying a correlation function to the parameters of the avatar template image and to the parameters of the input image, by representing the parameters of the avatar template image and the parameters of the input image as two vectors and computing a distance (e.g., Euclidean distance) between the vectors (where shortest distance indicates highest correlation), applying a similarity function, and the like.

Optionally, the head of the avatar body depicted in the selected dressed avatar image is replaced with the head of the user depicted in the input image. The head of the user including face and/or hair, may be extracted from the input image. The head of the user may be adapted according to the head of the avatar of the dressed avatar image, for example, resized, and/or reoriented. The head of the avatar in the dressed avatar image may be swapped with the adapted head of the user. The head swapping may be performed by a generative ML model trained to perform head swapping. The head swapping may give a more realistic and/or more natural visual appearance to the generated image, making the avatar wearing the clothing item appear like the user is wearing the clothing item.

At 220, the dressed avatar image that most closely resembles the user as depicted in the input image is provided, for example, presented on a display, printed out, forwarded to another device, stored on a data storage device, and/or fed into another process (e.g., animation application that simulates the avatar wearing the clothing item walking).

In the case of different sets of dressed avatar images virtually wearing different items of clothing, multiple dressed avatar images wearing different items of clothing may be provided. The same avatar template image may be used, dressed in the different items of clothing.

It is noted that FIG. 2 may be adapted to virtually dress up an image of a user rather than the avatar. For example, the feature described with reference to 202 may be replaced by the feature of accessing the image of the user described with reference to 214. Feature 216 may be implemented for computing the parameters of the user to be used for virtually dressing up the user. Features described with reference to 204-212 and 220 may be adapted, for virtually dressing up the image of the user rather than the avatar, using the parameters of the user.

Referring now back to FIG. 3, at 302, a ML image generator is selected and/or trained and/or accessed. The ML image generator may be implemented as an image to image generative model, that generates an adaptation of a body of an avatar in response to an input of a body of a subject. In another example, the ML image generator may be implemented as a prompt based generator that generates bodies of avatars in response to prompts, for example, desired parameters. The adaptation may be, for example, in response to an input of instructions, random, and/or for obtaining a target.

At 304, input into the ML image generator is accessed.

Optionally, the input is one or more input images. The input images are obtained when used as input into the ML image generator.

The input image depicts a body of a subject, optionally a human subject. The body of the subject may comply with a set of rules, for example, a standard pose, a frontal image depicting an upper body and/or lower body, with arms to the side of the body (i.e., not touching the body), and the like. The upper body may include the chest and/or abdomen and arms. The lower body may include the hips and/or pelvis, and legs.

Alternatively or additionally, the input may be parameters associated with the body of the subject. The parameters may be accessed and/or computed and/or measured. The parameters may be obtained by directly measuring the body of the human subject, for example, using a tape measure. Other approaches may be used for obtaining the parameters, for example, measuring the body of the subject on the image, such as with reference to a known calibration scale depicted in the image.

In yet another approach, the parameters associated with the body of the subject may be obtained as an outcome of a machine learning model fed the image of the body of the subject. The machine learning model may be trained on a training dataset of a multiple records. A record may include a training image of a subject and/or avatar, and a ground truth of the parameters measured on the subject and/or avatar depicted in the training image.

Alternatively or additionally, the input may be a prompt, such as a text description of the desired body of the avatar, for example, a tall skinny person, a short person with high body mass index (BMI), and the like.

Alternatively or additionally, the input may be a random seed for randomly generating a body of an avatar.

Alternatively or additionally, the input may be an inpainting.

At 306, the ML image generator is instructed to generate avatar template image(s) according to the input.

The ML image generator may be instructed, for example, by feeding the images of subjects having a variety of body types (obtained as described with reference to 304), feeding a prompt, feeding the parameters desired for the avatar, randomly, and the like.

Optionally, the input image and/or prompt and/or parameters and/or other input is fed into the ML image generator in combination with additional data. Alternatively, the additional data is fed into the ML image generator alone.

The additional data may include instructions for generating an avatar template image depicting a body of an avatar based on the input image of the body subject that is adapted according to the instructions. Examples of instructions include: increase size of body, decrease size of body, change skin tone, perform random adaptation, perform specific adaptation of one or more measurements, changes one or more parameters to, and the like. The instructions may be, for example, text, values for predefined fields (e.g., parameters), and the like.

Alternatively or additionally, the additional data may include the parameters of the body of the subject depicted in the input image. The parameters may be obtained as described herein. The parameters may be used by the ML image generator for generating the body of the avatar depicted in the avatar template image that be based on an adaptation of the parameters, optionally according to the input instructions and/or predefined settings of the ML image generator.

Alternatively or additionally, the additional data may include an indication of which parameters of the body of the subject depicted in the input image to adapt, for example, change skin color, change length of arms, etc . . . . The parameters may be used by the ML image generator for generating the body of the avatar depicted in the avatar template image that includes the adapted parameters.

Alternatively, no additional data is fed into the ML image generator. The ML image generator may be preset for generating an avatar template image based on the body of the subject that is adapted in a predefined way, for example, random adaptation, increase size, decrease size, and the like.

At 308, one or more avatar template images are obtained as an outcome of the ML image generator. Optionally, a single avatar template image is generated at a time in response to an input image of a subject. Alternatively, multiple avatar template images are generated in response to the input image of the subject.

The avatar template image depicts a body of an avatar, that is different than the body of the subject, optionally in one or more parameters. The avatar template image may be an adaptation of the body of the subject in one or more parameters. The adaptation of the avatar template image may be based on the inputted instructions, and/or based on predefined settings of the ML image generator. The parameters associated with the avatar template image may be based on parameters of the input image fed into the ML image generator.

Each avatar template image may be associated with parameters. The parameters may be obtained, for example, as an outcome of the ML image generator, an adaptation of parameters of the input image fed into the ML image generator, measured on the avatar template image, and/or by feeding into the machine learning model that determines parameters, as described with reference to 304.

At 310, features described with reference to 304-308 may be iterated, for creating a variety of different avatar template images which may cover one or more ranges of values of combinations of parameters. The iterations may terminate when a target range of values of combinations of the parameters is obtained, for example, predicted to correspond within a target accuracy range to possible input bodies of subjects (e.g., for about 95% of the population, or 99%, or 100%, or other values).

Referring now back to FIG. 4, features described with reference to FIG. 4, may be implemented with respect to feature 202 of FIG. 2. Features described with reference to FIG. 4 may be performed for each one of the avatar template images, for example as a pre-processing step. The selected avatar template image may have been previously pre-processed. Alternatively, the pre-processing is performed for the selected avatar template image.

At 402, a first set of keypoints is computed and/or extracted from the avatar template image. The first set of keypoints may be computed by applying a ML model to the body of the avatar depicted in the avatar template image. The ML model may be trained to extract keypoints, optionally keypoints associated with pose of the body.

At 404, the avatar template image may be parsed into multiple body parts referred to as a parsed avatar image. The multiple body parts may correspond to different parts of the clothing items which may be segmented. Example of parsed body parts include: arms, legs, upper body (e.g., chest), and lower body (e.g., pelvis). The parsing may be computed using a parsing ML model.

At 406, the parsed avatar image may be blurred, for creating a smooth avatar image. Blurring may be performed by applying a defined image filter with selectable mode, or other approaches.

At 408, the blurred avatar image may be divided. The image may be divided according to a first and second location (e.g., mean of x-coordinates) of a first and second cluster of pixels having an average pixel value denoting an arm. The division may be for identifying (e.g., separating) a left arm and a right arm.

At 410, one or more key regions are identified on the blurred avatar image. Examples of key regions include: "bra", "underwear", and "abdomen" (e.g., tummy, abs). The key regions may be identified, for example, by a segmentation model, a detection model, image processing approaches, and the like. For "bra" and "underwear", when multiple detections are made, the key region may be selected based on the vertical position (e.g., y-coordinates) where "bra" has y-coordinates higher than "underwear". For "abdomen", when no detection is made, a boundary (e.g., bounding box) may be automatically and/or manually set based on the detected bra and underwear boxes, for example, using a predefined expected relationship between distance from the "abdomen" to the "bra" and from the "abdomen" to the "underwear".

At 412, a segmentation mask may be generated for the abdomen using the abdomen detected on the blurred avatar image, for example, the bounding box. The segmentation mask may be applied to the parsed image, such as for identifying the abdomen. The segmentation mask may be computed using a segmentation ML model.

At 414, legs may be detected and segmented on the blurred avatar image. The detection may be performed by a detector ML model trained to detect leg regions. When at least two detections of kegs are made, each detected region may be segmented. The segmented leg regions may be applied to the parsed avatar image for identifying the legs, for example, by assigning labels to pixels identified as leg regions.

At 416, the blurred and parsed avatar image may be smoothed out for regenerating the parsed avatar image, for example, by filtering the image using a filter with optionally adjustable parameters.

Referring now back to FIG. 5, the exemplary method described with reference to FIG. 4 may be used for implementing features 206 and/or 208 of FIG. 2, related to adapting a (optionally segmented) source clothing item and/or generating the respective dressed image depicting each avatar template image wearing the source clothing item. Features described with reference to FIG. 5 may be performed on each avatar image template to create multiple dressed avatar images all wearing the same segmented source clothing item.

At 502, the segmented source clothing item may be parsed (e.g., divided) into multiple clothing parts. The segmentation may be performed by a trained segmentation ML model. When two of a type of clothing parts are detected for example, sleeves or pant legs, two clothing parts may be separated, for example, to left and right. The separation may help ensure proper positioning. The positions of the clothing parts may be determined. For example, when the clothing item is pants, the positions of the top, idle and/or bottom of the pant legs may be determined.

At 504, a transformation (e.g., rotation angle) of the segmented source clothing item may be computed, from a current orientation to alignment with a pose of the avatar body of the avatar template image. For example, rotation angle for alignment of the clothing item with the pose of the avatar template image.

Each of the clothing parts may be associated with a subset of the second set of keypoints computed for the clothing item. Alternatively or additionally, keypoints are extracted for each clothing part. The transformation may be computed for determining the orientation of each clothing part for being "worn" on the corresponding part of the body of the avatar of each avatar template image. The transformation may be computed according to a mapping between the subset of the second set of keypoints of the respective clothing part and the (corresponding matching) subset of the first set of keypoints of the corresponding body part of each avatar template image.

At 506, the transformation may be applied to each segmented source clothing part, optionally independently, to obtain a respective transformed source clothing part. For example, keypoints of the left sleeve and keypoints of the left arm are used to compute a transformation for the left sleeve from its pose in the second input image to the pose of the body of the avatar of each avatar template image. Independently, keypoints of the right sleeve and keypoints of the right arm are used to compute a transformation for the right sleeve from its pose in the second input image to the pose of the body of the avatar of each avatar template image, since the left sleeve and right sleeve may have different orientation in the second input image, and/or since the left arm and right arm may have different orientation in the body of the avatar.

The transformation may be applied to the second set of keypoints of the segmented source clothing item, optionally to each clothing part. to generate a transformed subset of second set of keypoints. The transformed subset of second set of keypoints may be better mapped (e.g., matched) to the keypoints of the body part of each avatar body, for improved "wearing" of each source clothing part.

At 508, the main part of the clothing item (e.g., center part of shirt, dress) may be simulated as being "worn" by the body of each avatar. An image of the avatar's body "wearing" the main part of the clothing item may be created by projecting the re-oriented source clothing part to the body of the avatar of the selected avatar template image. The projection may be computed by matching the transformed second set of keypoints to the first set of keypoints and according to the parameters of the avatar template image. The projection may be computed, for example, using an affine transformation.

The clothing item may be adapted to fit each avatar's body of each avatar template image according to the associated parameters. For example, the clothing item is stretched and/or resized to fit the body of each avatar according to the parameters which may defined the measurements of the avatar's body for each respective avatar template image.

At 510, the sleeves and/or pant legs may be simulated as being "worn" by the body of each avatar. A respective dressed avatar image of the avatar's body "wearing" the sleeves and/or pant legs may be created by projecting the re-oriented source clothing parts to the body of the avatar of the respective avatar template image. The projection may be computed by matching the transformed second set of keypoints to the first set of keypoints and according to the parameters of the respective avatar template image. The projection may be computed, for example, using an affine transformation.

The clothing item may be adapted to a fit the avatar's body of the respective avatar template image according to the associated parameters. For example, the clothing item is stretched and/or resized to fit the body of the avatar according to the parameters which may defined the measurements of the respective avatar's body. The projection may take into account the shape and/or alignment of the clothing part with the pose and/or shape of the corresponding body part of the avatar. For example, the right sleeve is projected to appear to be correctly worn on the right arm, and the left sleeve is projected to appear to be correctly worn on the left arm. Similarly, the right pant leg is projected to appear to be correctly worn on the right leg, and the left pant leg is projected to appear to be correctly worn on the left leg.

At 512, each of the individual projected clothing parts of the source clothing item may be aggregated to create a composite dressed avatar image of the avatar depicted in the respective avatar template image wearing the complete source clothing item. For example, the left sleeve, the right sleeve, and the main part of a shirt, are aggregated to generate a complete shirt in a composite image representing the avatar wearing the complete shirt.

At 514, a mask, optionally a variable width linear mask, on borders of a contour of the avatar of the avatar template image corresponding to each region of each body of each avatar on which a part of the source clothing item is projected, may be computed. The computation of the variable width linear mask may be performed by prioritizing clothing in areas of overlap between the clothing and the avatar, which may be designed to provide a natural look. Multiple masks corresponding to the multiple parts of the source clothing items may be created. A composite mask may be created by aggregating the multiple masks. The masks and/or composite may be for keeping track of areas of the body of the respective avatar where clothing items were added. In areas of overlap between clothing and the avatar, the clothing may take preference, for helping to ensure a natural look.

At 516, inpainting may be performed on the composite image, i.e., the dressed avatar image, for filling in areas where the parts of the source clothing item were added. The inpainting may be performed for improving visual blending of the source clothing item with a body of the avatar depicted in the respective avatar template image, especially in areas where clothing overlaps with the avatar's body. The inpainting may further enhance the realism of the virtual try-on. Inpainting may be performed according to the mask computed as described with reference to 514. Inpainting may be performed using a generative AI inpainting model which may be fed the mask and optionally a text description of the clothing item. Inpainting may be performed for each avatar image template to generate multiple dressed avatar images all wearing the same source clothing item.

Referring now back to FIG. 6, avatar template image 602 depicts an avatar, as described herein. Avatar template image 602 may be segmented for creating segmented image 604. Segmented regions include for example, arms, legs, underwear, bra, and stomach, as described herein. Image 606 includes extracted keypoints 608 (one group shown for clarity) identified on avatar template image 602, as described herein. The keypoints may be used for adapting the clothing item to the avatar's body, for dressing the avatar.

Referring now back to FIG. 7, input image 702 depicts an item of clothing, as described herein. Input image 702 may be segmented for creating segmented image 704. The segmentation may include different parts of the item of clothing, as described herein. Image 706 includes extracted keypoints 708 (one shown for clarity) identified on image 702, as described herein. The keypoints may be used for adapting the clothing item to the avatar's body, for dressing the avatar.

For any type of image, the relevant clothing item may be segmented only from the image, regardless of how the clothing item is presented, for example, post segmentation. Input images of clothing items may depict the clothing items in different angles and/or stretching states, as displayed on a model, or a perfect frontal image of the clothing item in case it was derived from a clothing item only image. Different approaches may be used for processing for clothing item only images versus images depicting clothing on a body (e.g., model), with sleeves and inner parts of the clothing item, as described herein.

Referring now back to FIG. 8, input image 802 depicts an item of clothing of a top with sleeves worn on a body (e.g., human, mannequin), as described herein. Input image 802 may be segmented for creating segmented image 804, by segmenting the left sleeve, the right sleeve, and the "body" of the top. Image 806 includes extracted keypoints 808 (one shown for clarity) identified on image 802, as described herein. The keypoints may be used for adapting the clothing item to the avatar's body, for dressing the avatar.

Referring now back to FIG. 9, input image 902 is of an item of clothing including a top with sleeves. Image 904 depicts an avatar wearing segmented parts of the clothing item. Dressed image 906 depicts the avatar wearing the item of clothing created by aggregating the parts of the item of clothing.

The clothing item may be placed on the image of the avatar according to clothing item type (e.g., top/bottom), based on identifying and/or matching between keypoints on the clothing item and the relevant keypoint on the avatar's body, indicating where the parts of the clothing item should be placed, as described herein. Clothing items may be stretched to adjust to different parameters, such as body parts' sizes of users' depictions represented by the avatar. In case of tops, sleeves may be placed separately after transformation to the desired user's hand position, as shown in image 904. The clothing item may be blended with the avatar (representing the user's body depiction), as shown in image 906. Masking may be used to inpaint the clothing item that was placed on the avatar, as described herein. Generative AI that uses clothing item descriptive text together with the inpainting may be used to obtain the final version of a dressed up avatar representing the user's depiction, as shown in image 906.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML models will be developed and the scope of the term ML model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating an image emulating a user visually trying on a clothing item, comprising:

in a set-up phase:

instructing a machine learning (ML) image generator for generating a plurality of avatar template images each depicting a different representative body type having a different plurality of parameters;

accessing a segmented source clothing item;

adapting the segmented source clothing item to correspond to the plurality of parameters of each avatar template image of the plurality of avatar template images;

for each avatar template image, generating a clothed image including the avatar template image wearing the segmented source clothing item according to the adapted segmented source clothing item;

during run-time:

receiving an input image depicting a body of a user;

computing a plurality of parameters of the body of the user depicted in the input image;

searching the plurality of avatar template images for an avatar template image most correlated with the plurality of parameters of the body of the user; and presenting the clothed image associated with the avatar template image, wherein a body of an avatar wearing the segmented source clothing depicted in the clothed image emulates the body of the user virtually wearing the source clothing.

2. The computer implemented method of claim 1, further comprising:

extracting a head of the user including face and hair, from the input image;

adapting the head according to the avatar template image; and for the clothed image, swapping the head of the avatar template image with the adapted head of the user.

3. The computer implemented method of claim 1, wherein the ML image generator is further fed instructions for adaptation of a training image of a body of a subject for generating an avatar template image depicting a body of an avatar based on the training image of the subject and adapted according to the instructions.

4. The computer implemented method of claim 1, wherein instructing the ML image generator is selected from: feeding a plurality of images of a plurality of subjects having a variety of body types, inpainting, feeding a prompt, and feeding the plurality of parameters.

5. The computer implemented method of claim 1, wherein the ML image generator is further fed the plurality of parameters in association with a respective image of a subject, wherein the plurality of parameters fed into the ML image generator are different than the plurality of parameters associated with the respective image of the subject, wherein the ML image generator further generates an outcome of the a body of an avatar having the plurality of parameters fed into the ML image generator.

6. The computer implemented method of claim 1, wherein the plurality of parameters associated with an avatar template image are obtained as an outcome of machine learning models fed the avatar template image, the machine learning models are trained on a training dataset of a plurality of training images of a plurality of subjects and/or avatars, each training image associated with a ground truth of the plurality of parameters measured on a subject and/or avatar depicted in the training image.

7. The computer implemented method of claim 1, wherein the plurality of avatar template images are iteratively generated by feeding in a training image of a subject and obtaining an avatar template image associated with a plurality of parameters, until a target range of values of combinations of the plurality of parameters is obtained.

8. The computer implemented method of claim 1, wherein the segmented source clothing item is adapted by stretching and/or resizing the segmented source clothing item according to the plurality of parameters to fit the avatar template image.

9. The computer implemented method of claim 1, further comprising:

computing a first set of keypoints from the avatar template image;

segmenting a source clothing item from an input image depicting clothing;

computing a second set of keypoints for the segmented source clothing item;

mapping the second set of keypoints of the segmented source clothing item to the first set of keypoints of the avatar template image, wherein the clothed image is generated according to the mapping.

10. The computer implemented method of claim 9, further comprising:

computing a transformation of the segmented source clothing item from a current orientation for alignment with a pose of the avatar template image, according to the mapping of the second set of keypoints to the first set of keypoint, and applying the transformation to the segmented source clothing item and the second set of keypoints to generate a transformed source clothing item and transformed second set of keypoints, wherein the clothed image is created by projecting the re-oriented source clothing item to the avatar template image by matching the transformed second set of keypoints to the first set of keypoints and according to the plurality of parameters of the avatar template image.

11. The computer implemented method of claim 10, further comprising:

dividing the segmented source clothing into a plurality of parts, each of the plurality of parts associated with a subset of the second set of keypoints, wherein the transformation, the applying the transformation, and the projection, are performed separately for each of the plurality of parts of the source clothing item; and generating the clothed image comprises aggregating each of the individual projected plurality of parts of the source clothing item to create a composite image of the avatar template image wearing the source clothing item.

12. The computer implemented method of claim 10, further comprising:

computing a variable width linear mask on borders of a counter of the avatar template image corresponding to a region of the body of the avatar on which a part of the source clothing item is projected, wherein a plurality of masks corresponding to the plurality of parts of the source clothing items are computed, wherein the computation of the variable width linear mask is performed by prioritizing clothing in areas of overlap between the clothing and the avatar, performing inpainting on the composite image for filling in areas where the plurality of parts of the source clothing item were added for improving visual blending of the source clothing item with a body of the avatar depicted in the avatar template image, wherein inpainting is performed by feeding the mask, a text description of the source clothing item, and the composite image, into a generative artificial intelligence model designed for inpainting.

13. The computer implemented method of claim 9, further comprising:

parsing the avatar template image into a plurality of body parts;

parsing the segmented source clothing item into a plurality of clothing parts;

wherein mapping comprises mapping each clothing part to a corresponding body part according to a subset of the second set of keypoints of the parsed clothing part that correspond to a subset of the first set of keypoints of the corresponding body part.

14. The computer implemented method of claim 13, wherein parsing the avatar template image into a plurality of body parts comprises:

parsing the avatar template image to create a parsed avatar image;

blurring the parsed avatar image to create a blurred avatar image;

dividing the blurred avatar image according to a first and second location of a first and second cluster of pixels having an average pixel value denoting an arm, for identifying a left arm and a right arm;

on the blurred avatar image, detecting at least one of: a bra, underwear, and abdomen;

generating a segmentation mask for the abdomen according to the abdomen detected on the blurred avatar image;

applying the segmentation mask to the parsed image for identifying the abdomen;

detecting and segment legs on the blurred avatar image;

applying the detected and segmented legs to the parsed avatar image for identifying the legs;

smoothing out the blurred avatar image for regenerating the parsed avatar image.

15. The computer implemented method of claim 9, wherein in response to the input image depicting the clothing being worn by a human or mannequin, the second set of keypoints is computed for the segmented source clothing item by applying a same ML model to the human or mannequin depicted in the input image that is applied to the avatar template image for extracting the first set of keypoints.

16. The computer implemented method of claim 9, wherein in response to the input image depicting the clothing alone without being worn by a human or mannequin, the second set of keypoints is predicted as an outcome of a ML model fed the source clothing item according to a type of the source clothing item.

17. The computer implemented method of claim 1, wherein the plurality of parameters of the body are selected from: at least one measurement of a region of a body, an upper body size, bottom body size, body shape, and skin color.

18. The computer implemented method of claim 1, wherein the clothed image is generated as an outcome of a generative ML model fed the adapted segmented source clothing item overlaid on the avatar template image, an inpainting mask defining inpainting of the adapted segmented source clothing on the avatar template image, and a text description of the source clothing item.

19. The computer implemented method of claim 1, wherein segmenting the source clothing item comprises:

in response to an input image depicting the clothing alone without being worn by a human or mannequin:

segmenting the source clothing item from the input image depicting the clothing alone; and segmenting sleeves and/or pant legs and an inner portion from the segmented source clothing item.

20. The computer implemented method of claim 1, further comprising segmenting the source clothing from an input image depicting the clothing being worn by a human or mannequin, by:

segmenting the source clothing from the input image;

creating an isolated clothing item image including the source clothing;

detecting and segmenting at least one body part of the human or mannequin and/or other object occluding at least one region of the source clothing of the input image;

updating a source clothing mask that defines borders of the segmented source clothing item for including borders of at least one occluding body part and/or other object;

using the updated source clothing mask, identifying one or more areas of the source clothing item for redrawing and/or recoloring for maintaining consistency of the source clothing, by computing an aggregation of colors of one or more regions of the source clothing, and applying the updated source clothing mask according the aggregation of colors to the identified one or more areas for creating a visually coherent image;

creating a colored layer based on the aggregation of colors of the segmented source clothing;

applying the colored layer to at least one missing part of the isolated clothing item image; and running an inpainting process on the isolated clothing item image with applied colored layer.

* * * * *